United States Patent [19]

Matsuoka

[11] 3,842,634

[45] Oct. 22, 1974

[54] APPARATUS FOR MAKING COILED SPRINGS

[76] Inventor: Takeji Matsuoka, No. 26-2-703, Oshima 3-chome, Koto-ku, Tokyo, Japan

[22] Filed: Dec. 12, 1972

[21] Appl. No.: 314,433

[30] Foreign Application Priority Data
Dec. 20, 1971 Japan.............................. 46-102740

[52] U.S. Cl.................................. 72/142, 72/449
[51] Int. Cl............................................. B21f 3/04
[58] Field of Search............. 72/142, 449, 131; 192/70.25, 70.3, 70.19

[56] References Cited
UNITED STATES PATENTS
2,163,019   6/1939   Blourt................................. 72/142
2,324,613   7/1943   Criley.............................. 192/70.19

Primary Examiner—Charles W. Lanham
Assistant Examiner—Robert M. Rogers
Attorney, Agent, or Firm—Stevens, Davis, Miller & Mosher

[57] ABSTRACT

The present invention relates an apparatus for making coiled springs characterized in that a friction clutch is inserted between a main shaft driven from the side of driving shaft and a driven gear wheel in the side of the arbor, and feeding and working of the wire are done during the slipping period of the said friction clutch.

3 Claims, 15 Drawing Figures

3,842,634
FIG. 1
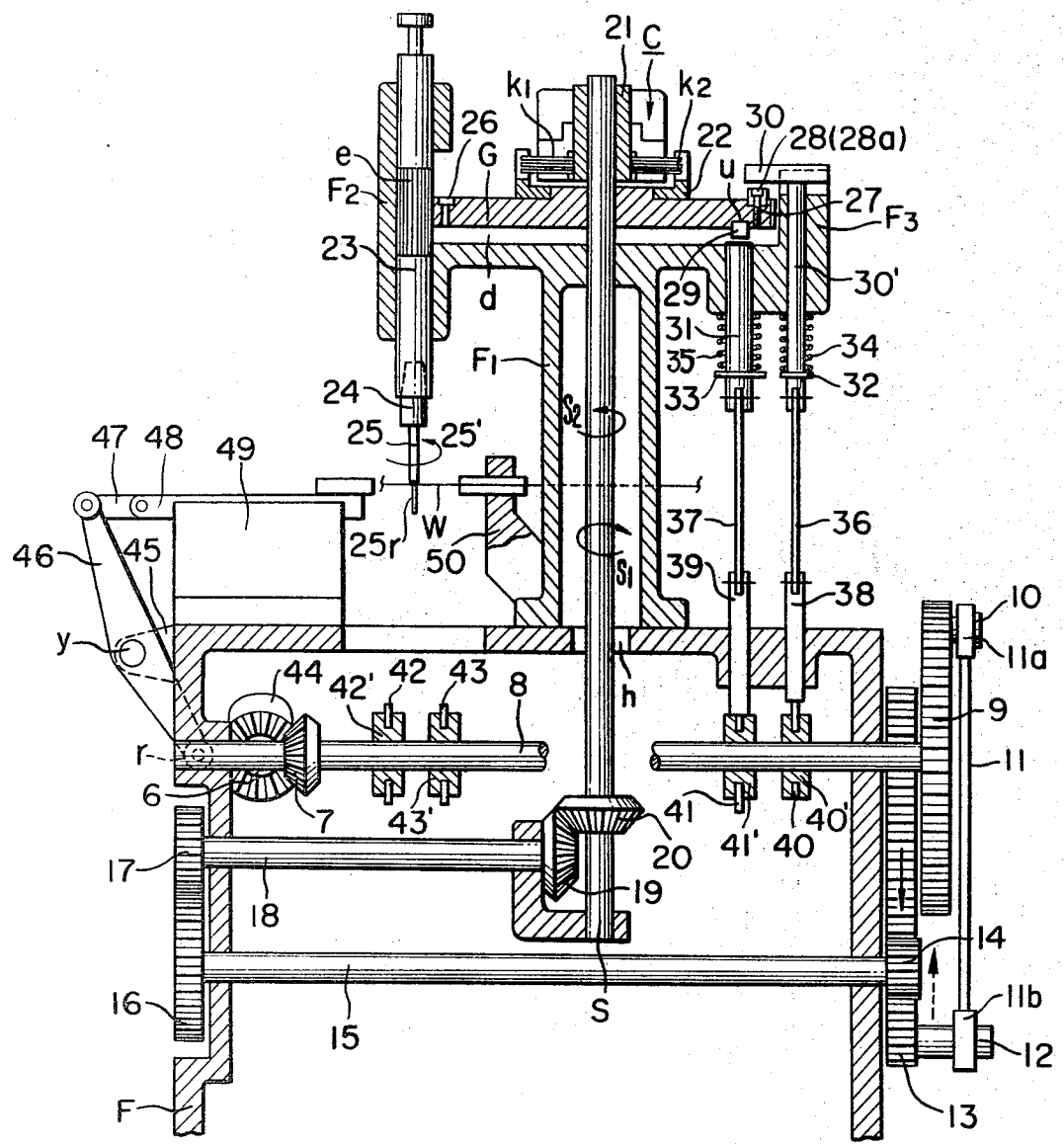
FIG. 2
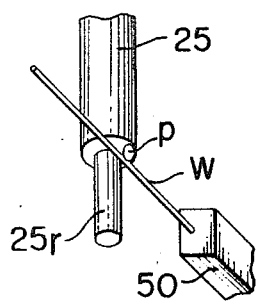
FIG. 3 ered the apparatus is

APPARATUS FOR MAKING COILED SPRINGS

DESCRIPTION OF THE PRIOR ART

In the prior art an apparatus for making coiled springs using a spindle member having an arbor mounted thereon for winding a blank wire thereon in helical formation, the spindle member is alternatively rotated in one and another direction for winding the wire, such as shown in FIG. 8 and 9, a driving segment 1 is keyed to the main shafts (in FIG. 1), and a pair of driven Segments 2, 2' complementary to driving segment 1 are secured to the driven gear wheel G (in FIG. 1). Both driven segments 2, 2' are opposed to each other, having the driving segment 1 located there between a pin 3 secured on the driving segment 1 and another pin 4 secured on the driven segment 2 so as to urge the driven gear wheel G (FIG. 1) clockwise with respect to the main shaft S. Hence, one end of each driven segment 2, 2' is maintained in touch with the edge of the driving segment 1. And, another end of each driven segment 2, 2' is held away from the opposed edge of the driving segment 1 by an angular distance of $m$ (FIG. 8). Assuming that the main shaft S is rotated counterclockwise in FIG. 9 segments 1, 2 and 2' strike each other by way of an angular distance $n$, and reach the state as shown in FIG. 8, and then the driven gear wheel G will be driven also counterclockwise by action of driving and driven segments 1, 2 and 2'. However, when the main shaft S reverses the direction of rotation, that is, starts to rotate clockwise in FIG. 9, the driven segments 2, 2' together with the driven gear wheel G will be left behind against the tension of coiled spring 5 and stand still until both edges 1a, 1a' of the driving segment 1 strike the opposed end 2a, 2a' of the driven segment 2, 2' respectively so as to drive the driven gear wheel G clockwise. The time interval during which the driving segment 1 travels the angular distance m is a dwell time of the driven gear wheel G, simultaneously of the arbor 25 (FIG. 1) for winding the blank wire W in helical configuration. Extended end portion Z1 and Z2 of the coiled spring Z must be worked or processed during this dwell period. In the beginning time of winding of the wire W, as the peripheral velocity of the arbor begins at $v_1$ in FIG. 7, the wire W slips against the said arbor. In the prior art apparatus, this dwell period is not sufficiently long to enable satisfactory processing on the extended end portions Z1, Z2 of the coiled spring Z. Moreover, the shape of finished coiled springs varies in considerable extent due to impetuous change of direction of rotation of the spindle member.

SUMMARY OF THE INVENTION

The present invention relates to an apparatus for making coiled springs, more particularly an apparatus for making coiled springs facilitating a processing operation on extended both end portions of each coiled spring.

It is object of the present invention to provide an apparatus for making coiled springs having a spindle member holding an arbor for winding a blank wire in helical configuration therearound and enable to have sufficiently long period of dwell time before and after rotation of the spindle member in each direction to perform a processing operation, such as forming of bends, hooks or loops, on both end extended portion of the coiled spring.

It is another object of the present invention to provide an apparatus for making coiled springs having a spindle member holding an arbor for winding a blank wire in helical configuration therearound and enabled to come quietly to stop without any bouncing at the end of rotation in each direction, thereby improving accuracy of the shape of finished products.

BRIEF DESCRIPTION OF THE DRAWINGS

Now, a preferable embodiment of an apparatus for making coiled springs according to the present invention will be hereinafter described in detail by way of example with reference to accompanying drawings, in which, FIG. 1 is a vertical section view showing an apparatus for making coiled springs according to the present invention, FIG. 2, is a perspective view showing a lower end of the arbor member in FIG. 1, FIG. 3 is a perspective view showing the coiled spring produced by the apparatus according to the present invention.

DESCRIPTION OF THE PREFERRED EMBODIMENT

Figure 4:
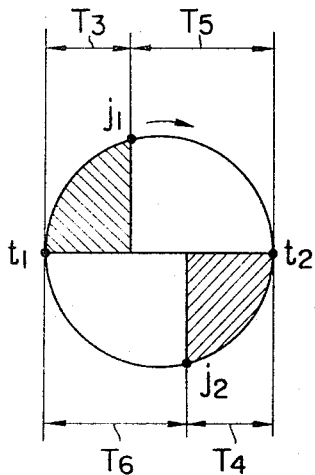
FIG. 4 is a diagram showing a start of dwell time of the arbor with reference to position of a crank pin of the driving mechanism in the present invention.

Referring to the FIG. 1, a crank shaft 8 having a wheel 9 provided with a crankpin 10 is rotatably mounted on a machine frame F and is operatively connected to a power shaft 6 by invention of a pair of bevel gears 7. A connecting rod 11 is rotatably connected at one end to the crankpin 10 and at the other end to a connection pin 12 secured on a rack member 13 which slidably mounted on the machine frame F so as to reciprocate by action of the crank pin 10 and the connecting rod 11. Means may be provided for adjusting the effective length of the connecting rod 11, if necessary. A pinion shaft 15 having a pinion 14 in mesh with the rack member 13 at one end is rotatably supported on the machine frame F and provided at the other end with a spur gear 16. A main shaft S is shown vertically in the middle of the machine frame F and operatively connected to the pinion shaft 15 by means of a pair of bevel gears 19, 20, an intermediate shaft 18 and a pair of spur gears 16, 17. Although not shown in the drawing, the main shaft S is rotatably mounted on the machine frame F by suitable bearings. As noted from the drawing, the main shaft S will rotate in one direction and then in opposite about its own axis when the crankshaft 8 makes one direction. A support member $F_1$ having a tubular portion encasing the main shaft S is upstanding from the machine frame F and provided with a flat top portion. A driven gear wheel G is rotatably mounted on the main shaft S adjacent to upper end thereof and spaced from the upper surface of the flat top portion of the support member $F_1$ by clearance $d$. The driven gear wheel G is provided in its outer periphery with teeth, which are meshed with splined teeth $e$ of a spindle member 23 which is rotatably and slidably mounted within a sleeve portion $F_2$ of the support member $F_1$. The spindle member 23 has an arbor 25 mounted thereon by means of a chuck 24. Also, the spindle member 23 can be lifted and decended by lifting member (not shown) which is driven by the crankshaft 8, and a reduced portion $25_r$ is formed at the lowest of the arbor 25, and a pawl member P is projected on the lower surface of the arbor 25. The wire W is held on said reduced portion $25_r$ during winding operation by means of the said pawl member P. A friction clutch C of puneumatic or hydraulic or electromagnetic type is mounted on top of the main shaft S. More particularly, a friction disk $k_1$ mounted on a sleeve member 21 secured to the main shaft S is located oppositely to another friction disc $k_2$ which is secured to the driven gear wheel G by means of a holder 22. In case of electromagnetic type clutch, both friction discs $k_1$ and $k_2$ will be attracted to and combined with each other so as to transmit the mechanical power from the main shaft S to the driven gear wheel G when electric voltage is applied on the friction clutch C. A T- shaped stopper 30 having a stem portion 30' is slidably mounted on one portion $F_3$ of the support member $F_1$. A coiled spring 34 is inserted between a collar 32 secured to the stem portion 30' of the stopper 30 and the lower surface of the support portion $F_3$ so as to urge the stopper 30 downwardly. The stopper 30 is connected to a slidable member 38 by means of a connecting rod 36. The slidable member 38 pierces the machine frame F and its lower surface is contact with the peripheral surface of cam 40 which is held between the holding member 40' mounted on the crank shaft 8 at all times. In similar manner, another stopper means 31 is slidably mounted on the support member $F_3$, urged downwardly by a coil spring 35 supported to the collar 33 which is attached to the connecting rod 37, and operatively connected to a cam means mounted on the crank shaft 8 by intervention of a slidable member 39 having a cam follower (not shown) and connecting rod 37, and its lower surface is contact with the peripheral surface of cam 41 which is hold between the holding member 41' mounted on the crank shaft 8 at all times.

An abutment 28 is bolted to the upper surface of the driven gear wheel G adjacent to peripheral portion thereof so as to abut with the stopper 30 when the latter is lowered, thereby preventing the drive gear wheel G from rotary motion. The driven gear wheel G is provided with a concentric groove 26 for receiving the abutment which is fitted therein and with a member of bolt holes 27 from which a suitable one is selected as desired to locate the abutment 28. Another abutment 28a may be located, if desired. In similar manner, an abutment 29 is mounted in the underside of the driven gear wheel G so as to abut with the stopper means 31 when the latter is lifted up, thereby preventing the driven gear wheel G from rotary motion.

A wire feed nozzle 50 is mounted on the machine frame F. Means is provided (not shown) for positively feeding an end of the wire W toward the arbor 25 through the wire feed nozzle 50. Cam means 42 and 43 respectively hold between the holding member 42', 43' secured to the crank shaft 8, and are intended for driving the wire feed means mentioned above. A tool carrier 48 is slidably mounted on a table 49 secured to the machine frame F. A swinging lever 46 is pivoted at pin Y supported on a support 45 secured on the machine frame F, having one end connected to the tool carrier 48 by means of a link 47 and the outer end equipped with a cam follower $r$ which is maintained in contact with a cam means 44 mounted on the power shaft 6. Hence, the tool carrier 48 will be moved reciprocatingly toward and away from the arbor 25 by action of the cam means 44. Also, in FIG. 6, 7, $j_5$ is a beginning time of winding of the arbor 25 in contacting state of the said segment 1, 2, 2', $j_6$ is a corresponding time of $j_4$ in FIG. 5, $j_7$ is a lifted time of the member corresponding to the stopper 30 in FIG. 1, $j_8$ is a corresponding time of $j_1$ in FIG. 4, V, $\theta$ are respectively peripheral velocity and rotating angle of the arbor, $V_o$, $V_2$ are respectively peripheral velocity of begining and end of winding of the arbor.

In operation, when the main shaft S starts to rotate in one direction, for instance, clockwise $S_1$ in FIG. 1, the driven gear wheel G will be also rotated clockwise if the friction clutch C is operating. However, when the abutment 28 or 28a (if provided) strikes the stopper means 30 which is lowered by action of the cam means 40, the driven gear wheel G will be prevented from rotation. That is, the arbor 25 together with the spindle member 23 will come to a stop. At this time, since the main shaft S is rotating, while the driven gear wheel G stands still, the friction disc $k_1$ is forcibly rotated or slipped with respect to the friction disc $k_2$ of the friction clutch C against the mutual attraction between both discs $k_1$ and $k_2$. If the stopper 30 is continuously maintained in its lowered condition until the main shaft S completes the clockwise rotation, the driven gear wheel G will be in dwell condition. However, as soon as the main shaft S stands to rotate in opposite direction, i.e. counterclockwise $S_2$ in FIG. 1, the driven gear wheel G will follow the same rotation since the friction clutch C is operating. But, when the abutment 29 in the underside of the driven gear wheel G comes to abut with the stopper 31 which is lifted up by action of the cam means 41, the driven gear wheel G will be withheed from rotation against the mutual attraction between both friction discs $k_1$, $k_2$. This condition will continue as long as the stopper 31 is lifted up.

FIG. 4 shows diagramatically the process of operation described above, taking a portion of the crank pin 10 as a reference. Assuming that the crank pin 10 is in its highest portion in FIG. 1 at time $t_1$ and comes to its lowest position at time $t_2$. After having travelled a half circle, that means a rotation of the main shaft S is one direction, a dwell time $j_1$ may be started as desired by selecting the position of abutment 28 on the upper surface of the driven gear wheel G and the timing of lowering of the stopper means 30, that is, contour of the cam means 40. In FIG. 4, upper shaded area shows a period during which the arbor 25 is rotated, that is, winding a wire W and upper blank area shows a dwell time of the arbor 25. $T_3$ is a winding period, and $T_5$ is a dwell period of the arbor 25. At the time $t_2$, the crank pin 10 will start to go upwardly to the highest point while making a half round travel, thus causing the main shaft S to be rotated in opposite direction.

During this rotation, a dwell time $j_2$ of the arbor 25 may be started as desired by selecting the position of abutment 29 in the underside of the driven gear wheel G and the timing of lifting of the stopper means 31, that is, contour of cam means 41. In FIG. 4, lower shaded area shows a period during which the arbor 25 is rotated, that is, winding a wire W and lower blank area shows a dwell time of the arbor 25. $T_4$ is a period during which the finished coil is released from the arbor 25 and $T_6$ is a dwell period of the arbor 25.

Figure 5:
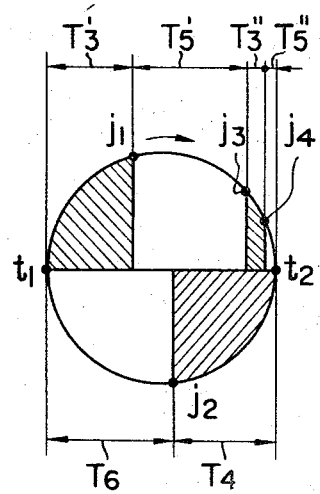
FIG. 5 is a diagram similar to that in FIG. 4 showing the driven gear wheel having three dwell times.
Figure 6:
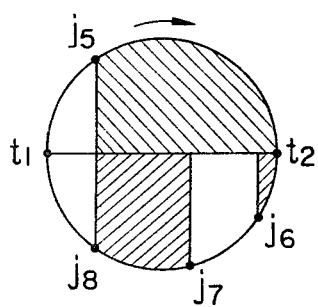
FIG. 6 is a diagram showing a start of dwell time of the arbor with reference to position of a crankpin of the driving mechanism in the prior art.
Figure 7:
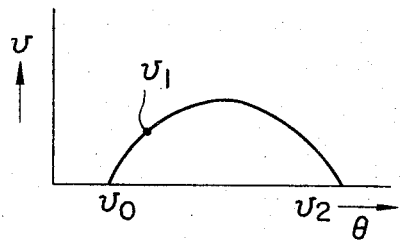
FIG. 7 is a diagram showing the rotating speed and rotating number in the arbor, FIG. 8, 9 are respectively a top plan view showing a part of the engagement between two members in the prior art.
Figure 8:
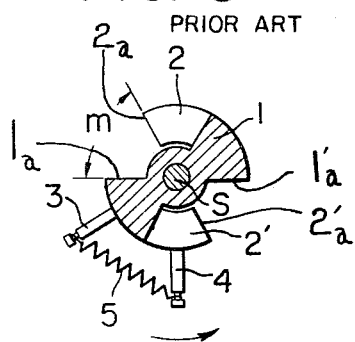
Figure 9:
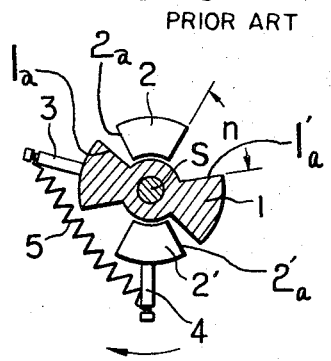
Figure 10A:
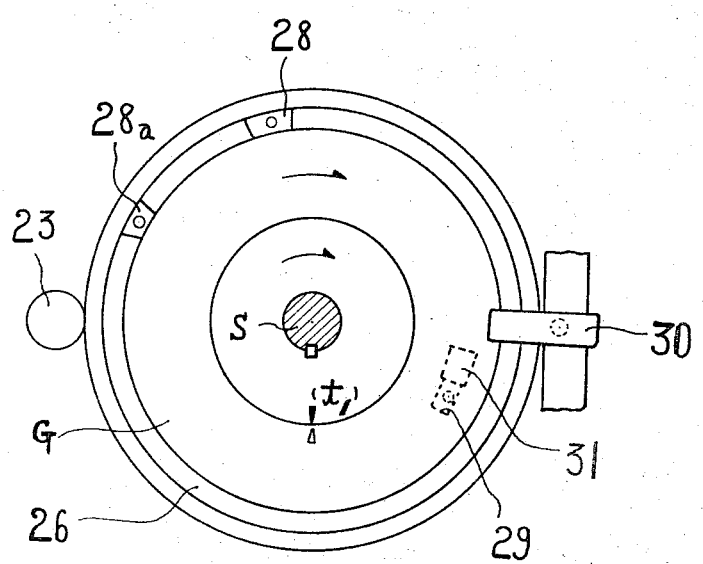
FIGS. 10a – 10f are a description of operation of the driven gear wheel.
Figure 10B:
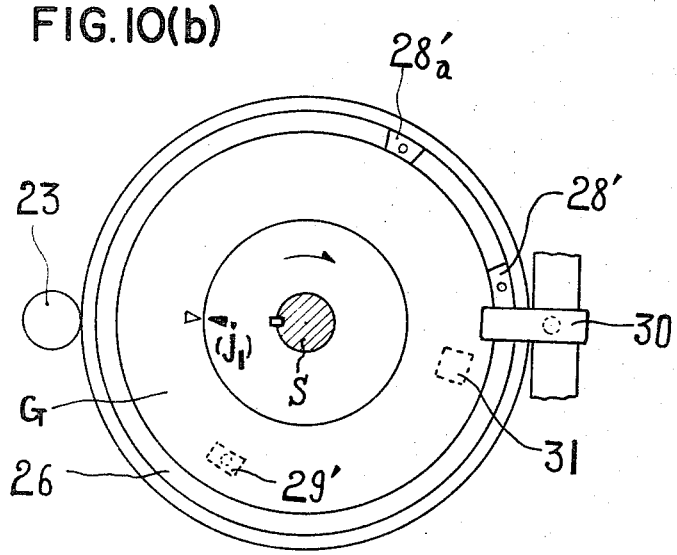
Figure 10C:
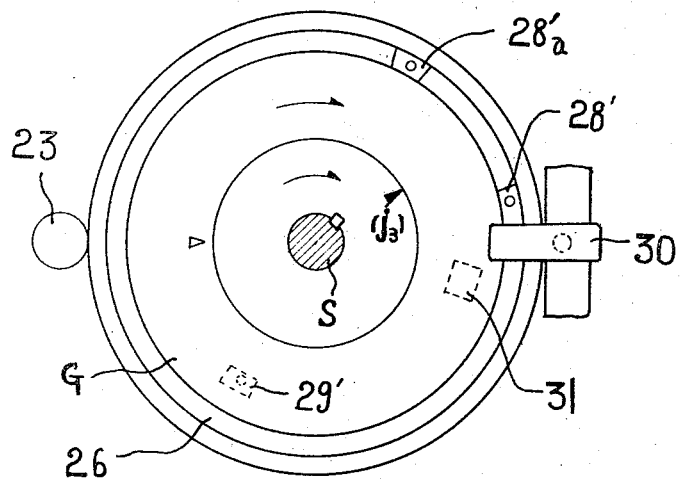
Figure 10D:
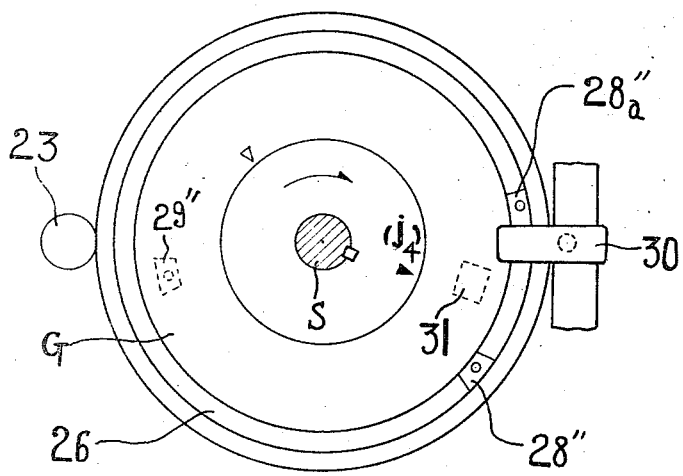
Figure 10E:
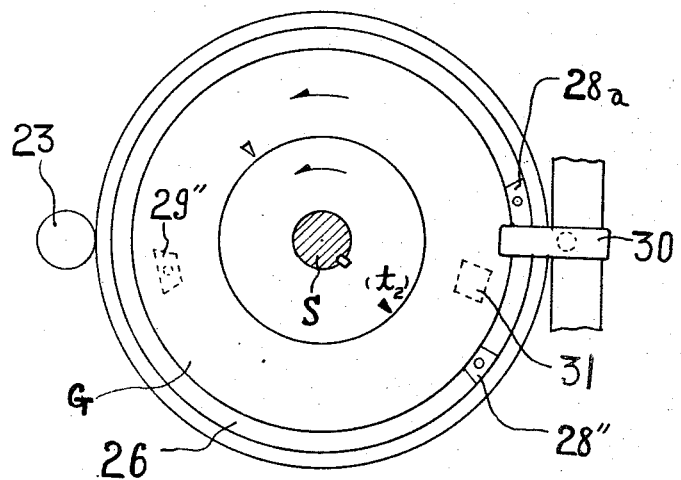
Figure 10F:
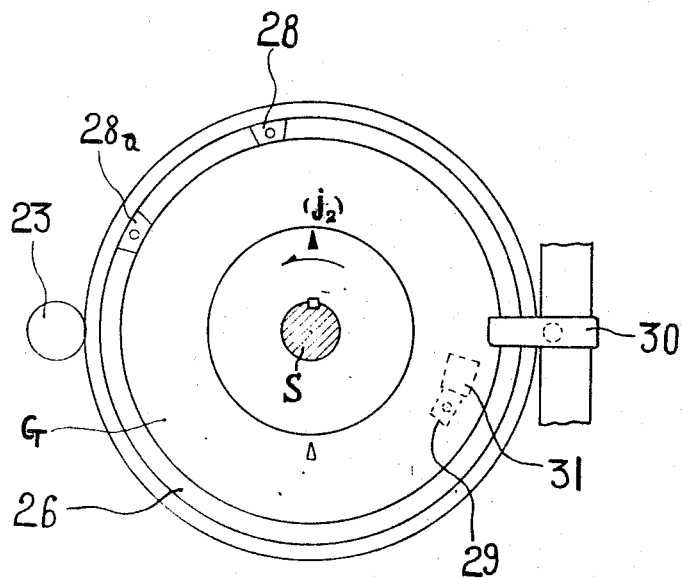

FIG. 5 shows a diagram representing the condition of dwell time when two abutments 28 and 28a are provided on the driven gear wheel G in the upper surface thereof so as to obtain two different dwell period shown by two blank area g in the upper half circle, and in FIG. 5. $T'_3$, $T'_5$ are respectively corresponding to $T_3$, $T_5$, $T_3''$ is a re-beginning period of winding of the arbor 25, and $T_5''$ is a dwell period of the arbor after $T'_3$, the following relation will be, that is, $$T_4 = T_3' + T_3''$$
$$T_6 = T_5' + T_5''$$

As described hereinabove, sufficiently long period of dwell time of the arbor can be obtained for carrying out a satisfactory processing on the extended end portions of the helical coil spring. And, the winding operation of the wire on the arbor may be stopped at any time, even in the middle of operation as described. Moreover, since the friction clutch means is operating at all times, there will be no bouncing in any member when the abutment strikes the stopper means. This will enhance the uniformity and accuracy of finished products.

What is claimed is;

1. An apparatus for making coiled springs comprising an arbor member for winding a wire in helical configuration thereon, a main shaft operatively connected to a driving power source so as to rotate alternately in one direction and the other, a driven gear wheel rotatably mounted on said main shaft and having peripheral teeth meshed with splined teeth formed on a spindle member having said arbor member connected thereto at one end thereof, abutments projecting respectively on the upper surface of said driven gear wheel and fittably mounted at the inner side of the peripheral teeth thereof, and abutment secured to the under surface of said driven gear wheel, stoppers abutted respectively with said abutments on said driven gear wheel and guided by the machine frame, a friction clutch consisting of friction discs respectively mounted on said main shaft and said driven gear wheel which slip upon engagement of stoppers with abutments so as to repeat continuously the winding, dwelling, releasing and dwelling of said arbor by way of said driven gear and splined teeth of said spindle member.

2. The apparatus for making coiled springs as described in claim 1, including a concentric groove provided adjacent to the outer periphery and in the upper surface of said driven gear wheel, a number of bolt holes provided at the under side of said concentric groove, said abutments fittably mounted on said bolt holes and projecting on the upper surface of said concentric groove, said abutment located at the inner side of said abutments and projecting on the under surface of said driven gear wheel, permitting selection of the desired position of said abutments so as to adjust the operating period of said arbor.

3. The apparatus for making coiled springs as described in claim 1, including two connecting rods connected respectively to the underside of said stoppers, coiled springs surrounding said connecting rods adapted to urge said connecting rods downwardly, two cams secured to a drive shaft and operatively connected to said connecting rods, said drive shaft driving said main shaft.

* * * * *